United States Patent
Lee et al.

(10) Patent No.: US 7,292,650 B2
(45) Date of Patent: Nov. 6, 2007

(54) OFDM RECEIVER AND METRIC GENERATOR THEREOF

(75) Inventors: Tsung-Lin Lee, Hsinchu (TW); Rong-Liang Chiou, Taipei (TW)

(73) Assignee: Silicon Integrated Systems Corp., Hsin-chu (TW)

( * ) Notice: Subject to any disclaimer, the term of this patent is extended or adjusted under 35 U.S.C. 154(b) by 743 days.

(21) Appl. No.: 10/609,496

(22) Filed: Jul. 1, 2003

(65) Prior Publication Data

US 2005/0002472 A1    Jan. 6, 2005

(51) Int. Cl.
*H03M 13/00*    (2006.01)
*H03K 9/00*    (2006.01)
*H04L 27/06*    (2006.01)

(52) U.S. Cl. ............... 375/316; 375/341; 375/325; 375/340; 375/262; 714/792; 714/791; 714/759

(58) Field of Classification Search ........... 375/316, 375/341, 325, 340, 262, 240.26, 265; 714/791–795, 714/759–760
See application file for complete search history.

(56) References Cited

U.S. PATENT DOCUMENTS

| | | | | |
|---|---|---|---|---|
| 4,945,549 A | * | 7/1990 | Simon et al. | 375/280 |
| 5,896,405 A | * | 4/1999 | Moon | 714/795 |
| 5,966,401 A | * | 10/1999 | Kumar | 375/150 |
| 7,099,410 B1 | * | 8/2006 | Chennakeshu et al. | 375/341 |
| 2002/0051498 A1 | * | 5/2002 | Thomas et al. | 375/262 |
| 2002/0186797 A1 | * | 12/2002 | Robinson | 375/341 |
| 2006/0224934 A1 | * | 10/2006 | Cameron et al. | 714/752 |

OTHER PUBLICATIONS

Lee et al., IEEE Transactions on Consumer Electronics, vol. 44, No. 3, p. 994-1000 (1998).

* cited by examiner

*Primary Examiner*—David C. Payne
*Assistant Examiner*—Linda Wong
(74) *Attorney, Agent, or Firm*—Birch, Stewart, Kolasch & Birch, LLP

(57) ABSTRACT

A metric generation scheme for use in OFDM receivers. In a preferred embodiment, an OFDM receiver of the invention includes a dynamic quantizer to compress a series of channel-state information values. Also, a bit de-interleaver is provided to de-interleave a series of symbol-based data inverse to interleaving operations at a transmitter end. The de-interleaved symbol-based data is further compressed by another dynamic quantizer to yield a complex signal according to a constellation scheme. Then a metric generator calculates a bit metric of a zero group and a bit metric of a one group for each received bit in which the constellation is divided into the one group and the zero group for each bit location.

17 Claims, 15 Drawing Sheets

OFDM RECEIVER AND METRIC GENERATOR THEREOF

BACKGROUND OF THE INVENTION

1. Field of the Invention

The invention relates to Orthogonal Frequency Division Multiplexing systems and more particularly to an efficient scheme for metric generation in OFDM receivers.

2. Description of the Related Art

Orthogonal Frequency Division Multiplexing (OFDM) is well known as a highly spectral efficient transmission scheme capable of dealing with severe channel impairment encountered in a wireless environment. The basic idea of OFDM is to divide the available spectrum into several sub-channels (sub-carriers). By making all sub-channels narrowband, they experience almost flat fading, which makes equalization very simple. To obtain a high spectral efficiency the frequency response of the sub-channels are overlapping and orthogonal. This orthogonality can be completely maintained, even though the signal passes through a time-dispersive channel, by introducing a cyclic prefix (or guard interval). A cyclic prefix is a copy of the last part of the OFDM symbol which is pre-appended to the transmitted symbol. This makes the transmitted signal periodic, which plays a decisive roll in avoiding inter-symbol and inter-carrier interference.

OFDM signaling can largely eliminate the effects of inter-symbol interference for high-speed transmission in highly dispersive channels by separating a single high speed bit stream into a multiplicity of much lower speed bit streams each modulating a different sub-carrier. Fortunately, the apparently very complex processes of modulating (and demodulating) thousands of sub-carriers simultaneously are equivalent to Discrete Fourier Transform operations, for which efficient Fast Fourier Transform (FFT) algorithms exist, Thus integrated circuit implementations of OFDM demodulators are feasible for affordable mass-produced receivers. Furthermore, the use of error coding, interleaving, and channel-state information (CSI) allows OFDM signaling to function in a manner that is well suited to the needs of the terrestrial broadcasting channel. To combat frequency-selective fading and interference, channel decoding with soft-decision decoding can be properly integrated with an OFDM system. By means of interleaving the coded data before assigning them to OFDM sub-carriers at the modulator, clusters of errors caused by channel impairment can be broken up at the receiving end. The soft-decision decoding is carried out by a well known Viterbi decoder in an OFDM receiver. The Viterbi decoder is a sort of maximum likelihood decoder for the convolutional coding and must be fed with a soft decision comprising a measure or metric of the received signal. A metric can be made separately for each received bit to indicate a degree of confidence.

When data are modulated onto a single carrier in a time-invariant system, then a priori all data symbols suffer from the same noise power on average; the soft-decision information simply needs to take note of the random symbol-by-symbol variations that this noise causes. When data are modulated onto the multiple OFDM sub-carriers, the metrics become slightly more complicated as the various carriers will have different signal-to-noise ratios (SNR). For example, a carrier which falls into a notch in the frequency response will comprise mostly noise; one in the peak will suffer much less. Thus, in addition to the symbol-by-symbol variations, there is another factor to take account for in soft decisions: data conveyed by sub-carriers having a high SNR are a priori more reliable than those conveyed by sub-carriers having low SNR. This extra a priori information is usually known as channel-state information (CSI). The CSI concept can be extended to embrace interference which affects sub-carriers selectively. The inclusion of CSI in the generation of soft decisions is the key to the unique performance of OFDM in the presence of frequency-selective fading and interference.

OFDM has therefore been chosen for two recent standards for broadcasting—Digital Audio Broadcasting (DAB) and Digital Video Broadcasting for Terrestrial (DVB-T). Systems for DAB and DVB-T have been standardized by ESTI for use in Europe and elsewhere in the world. However, the existing mass-produced consumer products are not very cost-effective. It is shown that the system performance is heavily dependent on the OFDM receiver architecture. In particular, the most critical consideration is how to design and arrange the de-interleaving, metric generation as well as soft-decision decoding in an OFDM receiver. Accordingly, what is needed is a new and cost-effective architecture suitable for OFDM receivers.

SUMMARY OF THE INVENTION

It is an object of the present invention to provide a metric generator for a soft-decision decoder in an OFDM receiver.

It is another object of the present invention to provide a novel arrangement for an OFDM receiver, which is well-suited to integrated circuit implementation and features better system performance.

According to one aspect of the invention, a metric generator for use in OFDM receivers is disclosed. The metric generator includes a bit-distance calculator to receive a complex signal along with a constellation that is divided into a one group and a zero group for each bit location, in which the complex signal is modulated using the constellation. The bit-distance calculator is provided to calculate a first distance of the zero group and a second distance of the one group for each received bit. The metric generator further includes a first multiplier where the first distance of the zero group is multiplied by a weighting factor associated with the complex signal to yield a bit metric of zero for each received bit. The metric generator also has a second multiplier where the second distance of the one group is multiplied by the same weighting factor to yield a bit metric of one for each received bit.

Preferably, the bit-distance calculator is made up of a first means, a second means, a detecting means and a calculating means. With the first means, the complex signal is shifted by a predetermined value depending on the constellation and an integer part of the shifted complex signal is extracted. Hence, the detecting means can find a first position and a second position respectively located in the zero and the one groups for each bit from a lookup table for the constellation. Note that the first position is nearest to the integer part of the shifted complex signal within the zero group of the constellation while the second position is nearest to the integer part of the shifted complex signal within the one group of the constellation. The first and the second positions are fed to the second means where they are inversely shifted by the predetermined value, respectively. After that, the calculating means calculates the first distance of the zero group between the complex signal and the inversely shifted first position. As well, the calculating means calculates the second distance of the one group between the complex signal and the inversely shifted second position.

According to another aspect of the invention, an OFDM receiver is comprised of a de-interleaver, a dynamic quantizer and a metric generator. The de-interleaver is employed to de-interleave a series of symbol-based data inverse to interleaving operations at a transmitter end, in which the symbol-based data is modulated with a constellation. The dynamic quantizer is coupled to the de-interleaver to compress the de-interleaved symbol-based data and yield a complex signal depending on a scheme of the constellation accordingly. The metric generator is coupled to the dynamic quantizer to receive the complex signal. Specifically, the constellation is partitioned into a one group and a zero group for each bit location. Thus, the metric generator can produce a bit metric of zero with respect to the zero group and a bit metric of one with respect to the one group for each received bit, separately.

According to yet another aspect of the invention, an OFDM receiver includes a bit de-interleaver, a metric generator and two dynamic quantizers. A first dynamic quantizer can compress a series of channel-state information values. The bit de-interleaver is used to de-interleave a series of symbol-based data inverse to interleaving operations at a transmitter end, in which the symbol-based data is modulated with a constellation. The bit de-interleaver also provides the compressed channel-state information value associated with the de-interleaved symbol-based data. A second dynamic quantizer is coupled to the bit de-interleaver to compress the de-interleaved symbol-based data and yield a complex signal depending on a scheme of the constellation accordingly. The metric generator is respectively coupled to the second dynamic quantizer and the bit de-interleaver to receive the complex signal and the compressed channel-state information value associated with the complex signal. Note that the constellation is partitioned into a one group and a zero group for each bit location. Thus, the metric generator can produce bit metrics of zero and one with respect to the zero and the one groups of the constellation for each received bit, separately. In a preferred embodiment, the bit metric of zero and the bit metric of one for an even-numbered bit are computed from a real part of the complex signal and the compressed channel-state information value associated with the complex signal. On the other hand, the bit metric of zero and the bit metric of one for an odd-numbered bit are computed from an imaginary part of the complex signal and the compressed channel-state information value associated with the complex signal.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE DRAWINGS

The present invention will become more fully understood from the detailed description given hereinbelow and the accompanying drawings, which are given by way of illustration only, and thus are not limitative of the present invention, and and in which.

DETAILED DESCRIPTION OF THE INVENTION

Figure 1:
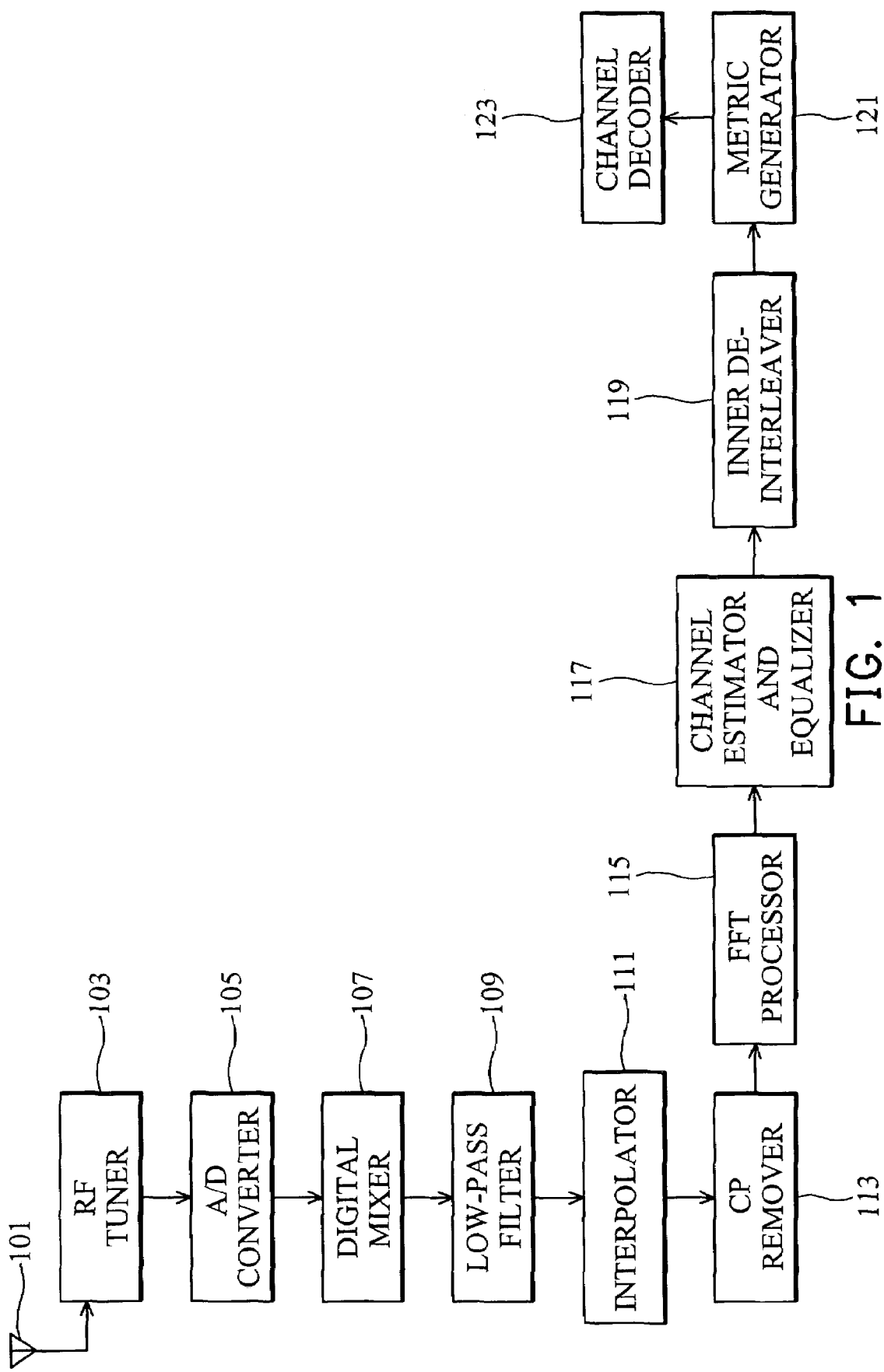
FIG. 1 is a block diagram illustrating an OFDM receiver according to the invention.

FIG. 1 shows a block diagram of an OFDM receiver in accordance with an arrangement of the invention. The receiver 100 conforms to, but is not limited to, the ESTI standard for DVB-T. Briefly, a radio frequency (RF) signal is received via an antenna 101 and its signal band is translated to a lower frequency, namely the intermediate frequency (IF), by an RF tuner 103. The IF signal is then digitized by an A/D converter 105. A digital mixer 107 accepts the digitized IF signal at its input and converts it to baseband. The baseband signal is digitally filtered via a low-pass filter 109 and subjected to an interpolation by an interpolator 111 before entering the subsequent FFT processor 115. The interpolator output signal is first manipulated by a CP remover 113, which performs deletion of the cyclic prefix (CP). The FFT processor 115 applies a Fast Fourier Transform (FFT) and demodulation to the output of the CP remover 113. In DVB-T, two modes of operation are defined: a "2K mode" and an "8K mode". Therefore the FFT processor 115 must be capable of performing a 2048-point FFT in the 2K mode or an 8192-point FFT in the 8K mode. The FFT result is processed by a channel estimator and equalizer 117, which performs two functions: channel estimation and frequency equalization. The output of the channel estimator and equalizer 117 is then fed to an inner de-interleaver 119 that inverts inner interleaving functions defined in the DVB-T standard before metric computation. A metric generator 121 accepts the de-interleaved data and generates bit metrics for the soft-decision decoding. Finally, a channel decoder 123 receives the bit metrics and outputs a decoded bit-stream.

Figure 2:
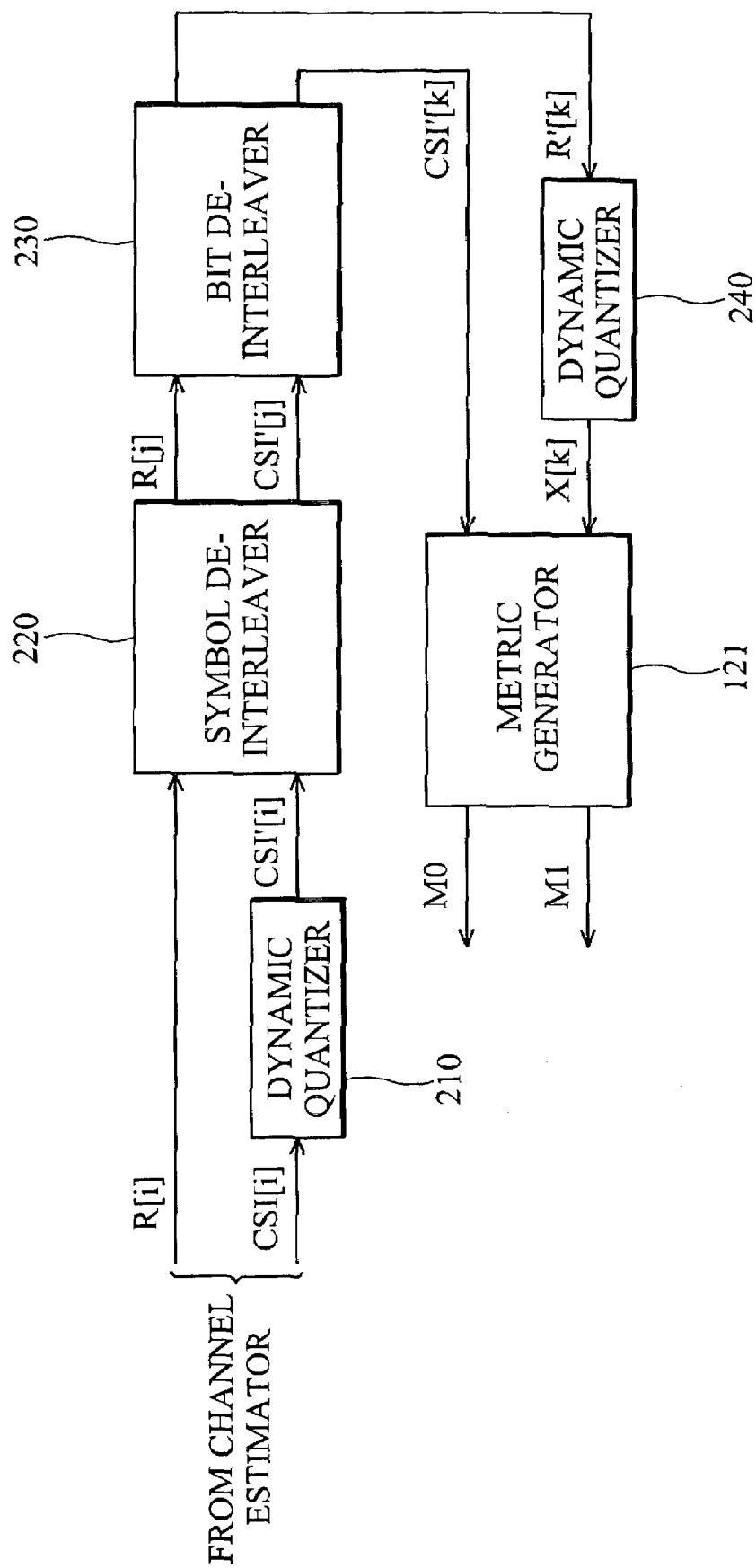
FIG. 2 is a block diagram illustrating the inner de-interleaver and metric generator of FIG. 1.
Figure 3A:
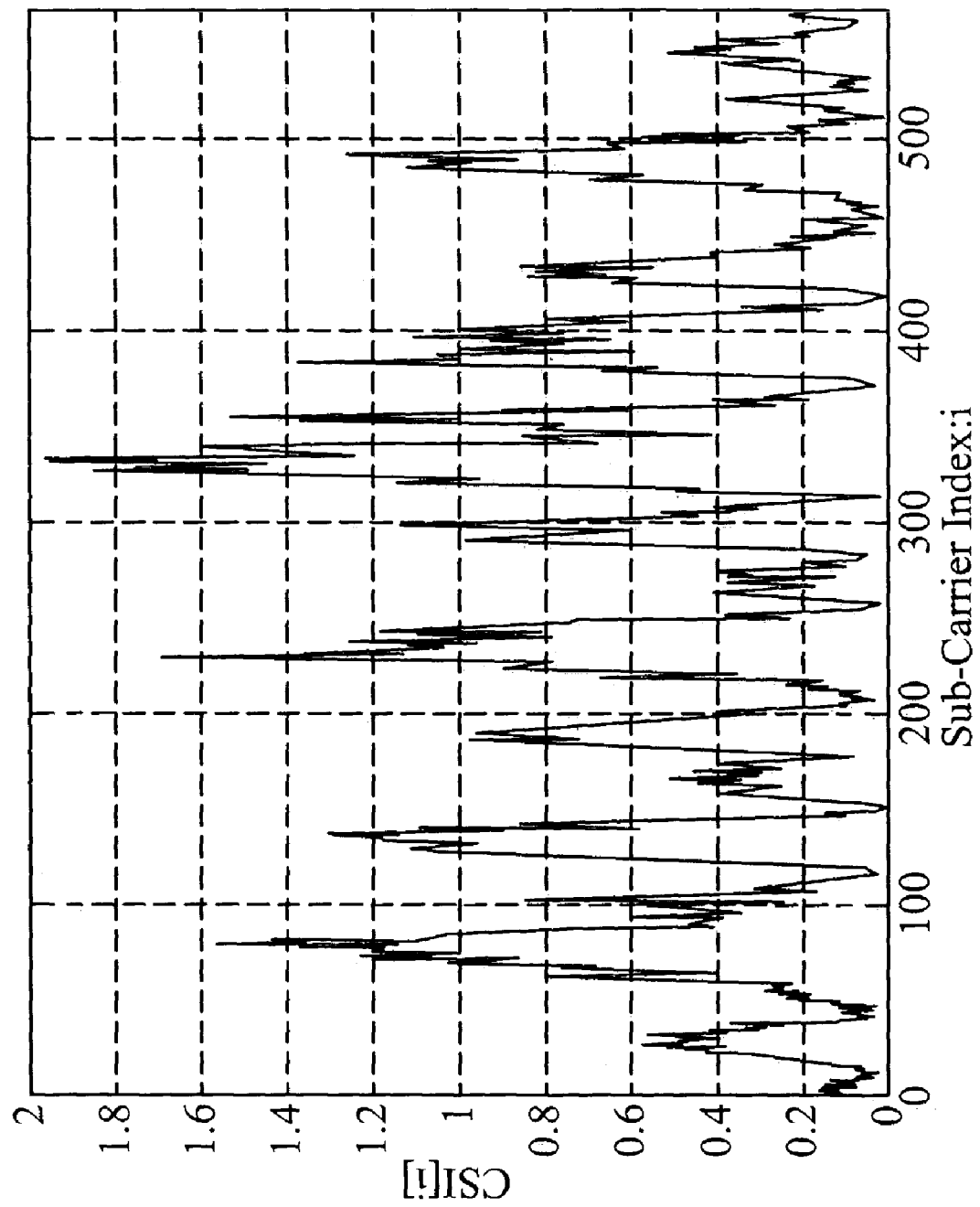
FIG. 3A is a graph showing a CSI output signal of the channel estimator of FIG. 1.
Figure 3B:
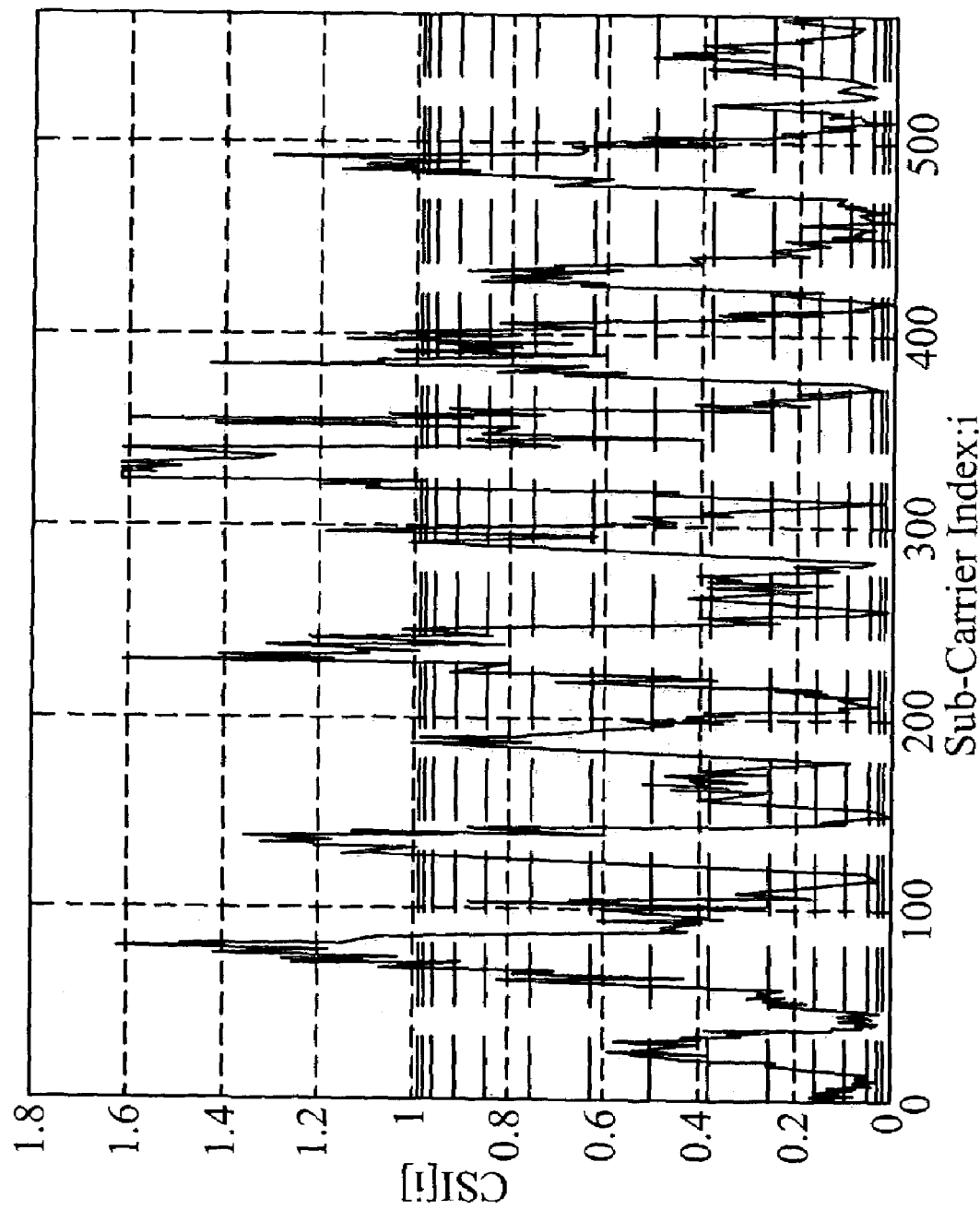
FIG. 3B is a graph showing the pre-clipped CSI signal prior to dynamic quantization.
Figure 3C:
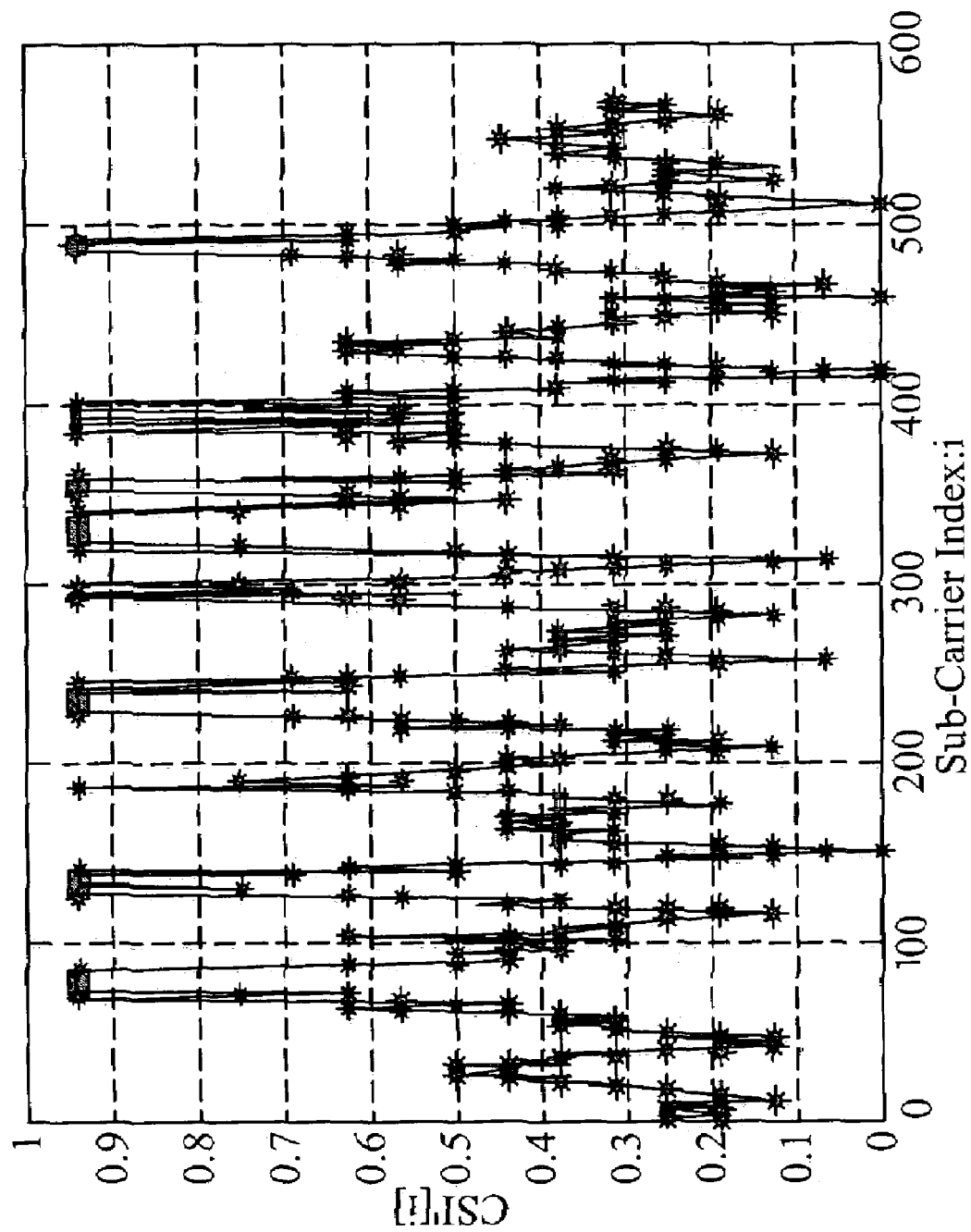
FIG. 3C is a graph showing the dynamically quantized CSI signal according to the invention.

The present invention mainly focuses on the inner de-interleaver 119 and the metric generator 121. As depicted in FIG. 1, it should be noted that the metric computation is preceded by the inner de-interleaving. This indeed leads to better performance than prior arts. The principles of the invention will now be explained from embodiments taken in conjunction with the accompanying table and graphs. Referring to FIG. 2, the inner de-interleaver 119 is made up of a symbol de-interleaver 220 and a bit de-interleaver 230 in addition to two dynamic quantizers 210 and 240. To alleviate the memory requirement, the dynamic quantizer 210 is provided to compress a series of channel-state information (CSI) values derived from the channel estimator and equalizer 117, where CSI[i] denotes the CSI value at sub-carrier index i. FIG. 3A shows exemplary CSI values estimated by the channel estimator and equalizer 117. The CSI values are subjected to a pre-clipping operation before dynamic quantization. FIG. 3B shows the pre-clipped result of CSI[i] in which the CSI values are clipped to a predetermined value. The pre-clipping operation does not affect the receiver performance substantially. The clipped CSI values are further dynamically quantized without any loss of receiver performance to reduce the required memory size of the subsequent symbol de-interleaver 220 and bit de-interleaver 230. In one embodiment, 8-bit CST values are dynamically quantized and the results are represented with 4-bit precision. The compressed CSI values, CSI'[i], are shown in FIG. 3C.

Turning back to FIG. 2, the symbol de-interleaver 220 accepts CSI'[i] and a series of symbol-based data at its inputs and changes the order of the symbol-based data series inverse to the symbol interleaving process at the transmitter end. The series of symbol-based data comes from the channel estimator and equalizer 117 in which symbol-based data at sub-carrier index i is denoted by R[i]. Naturally, the symbol-based data R[i] is modulated using a constellation at the transmitter end. The symbol de-interleaver 220 also provides the compressed CSI value associated with the de-interleaved symbol-based data. According to the invention, the outputs of the symbol de-interleaver 220 R[j] and CSI'[j] are first fed to the bit de-interleaver 230 where R[j] and CSI'[j] are de-interleaved inverse to the bit interleaving process at the transmitter end. Another dynamic quantizer 240 is coupled to the bit de-interleaver 230 to compress the de-interleaved symbol-based data R'[k] and yield a complex signal X[k] depending on a scheme of the constellation accordingly. In DVB-T systems, the OFDM signal is modulated on 1,705 sub-carriers in the 2K mode and 6,817 in the 8K mode. In addition, these sub-carriers comprise four different types of carriers: which are data carriers, continual pilots, scattered pilots and TPS pilots. The TPS pilots are used for the purpose of signaling parameters related to the channel coding and modulation, which convey parameters including constellation, hierarchy information and so forth. Therefore the dynamic quantizer 240 can acquire the constellation scheme from received TPS signaling information. Although the de-interleaved symbol-based data R'[k] is dynamically quantized, the maximum resolution is still preserved without loss of performance. In one embodiment, R'[k] is designated by a 9-bit signed-magnitude representation; 8 bits for the magnitude and one bit for the sign, i.e., S4.4 where S denotes the sign bit, four least significant bits denote the fractional part of the magnitude and the remaining four bits are the integer part of the magnitude. The output of the dynamic quantizer 240, X[k], can be designated by a 6-bit signed-magnitude representation, that is, S1.4, S2.3 and S3.2 for non-hierarchical QPSK, 16-QAM and 64-QAM constellations, respectively. It should be appreciated to those skilled in the art that the dynamic quantizer 240 is applicable to hierarchical constellations as well. The metric generator 121 is respectively coupled to the dynamic quantizer 240 and the bit de-interleaver 230 to receive the complex signal X[k] and the compressed CSI value CSI'[k] According to the invention, the constellation is partitioned into a one group and a zero group for each bit location Thus, the metric generator 121 can produce a bit metrics of zero, M0, and a bit metrics of one, M1, with respect to the zero and the one groups of the constellation for each received bit, separately.

Figure 4A:
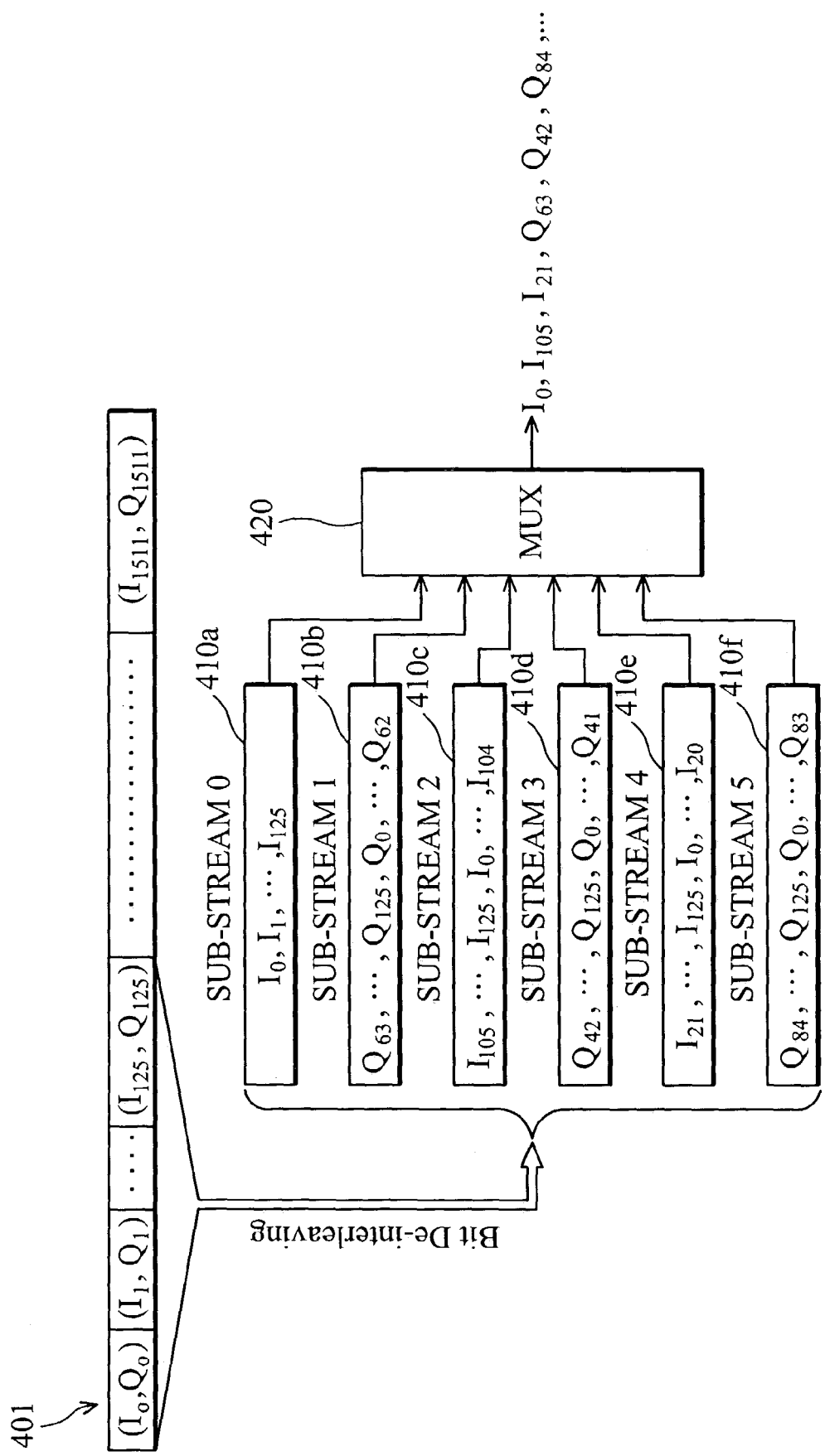
FIG. 4A is a conceptual diagram illustrating a bit de-interleaver.
Figure 4B:
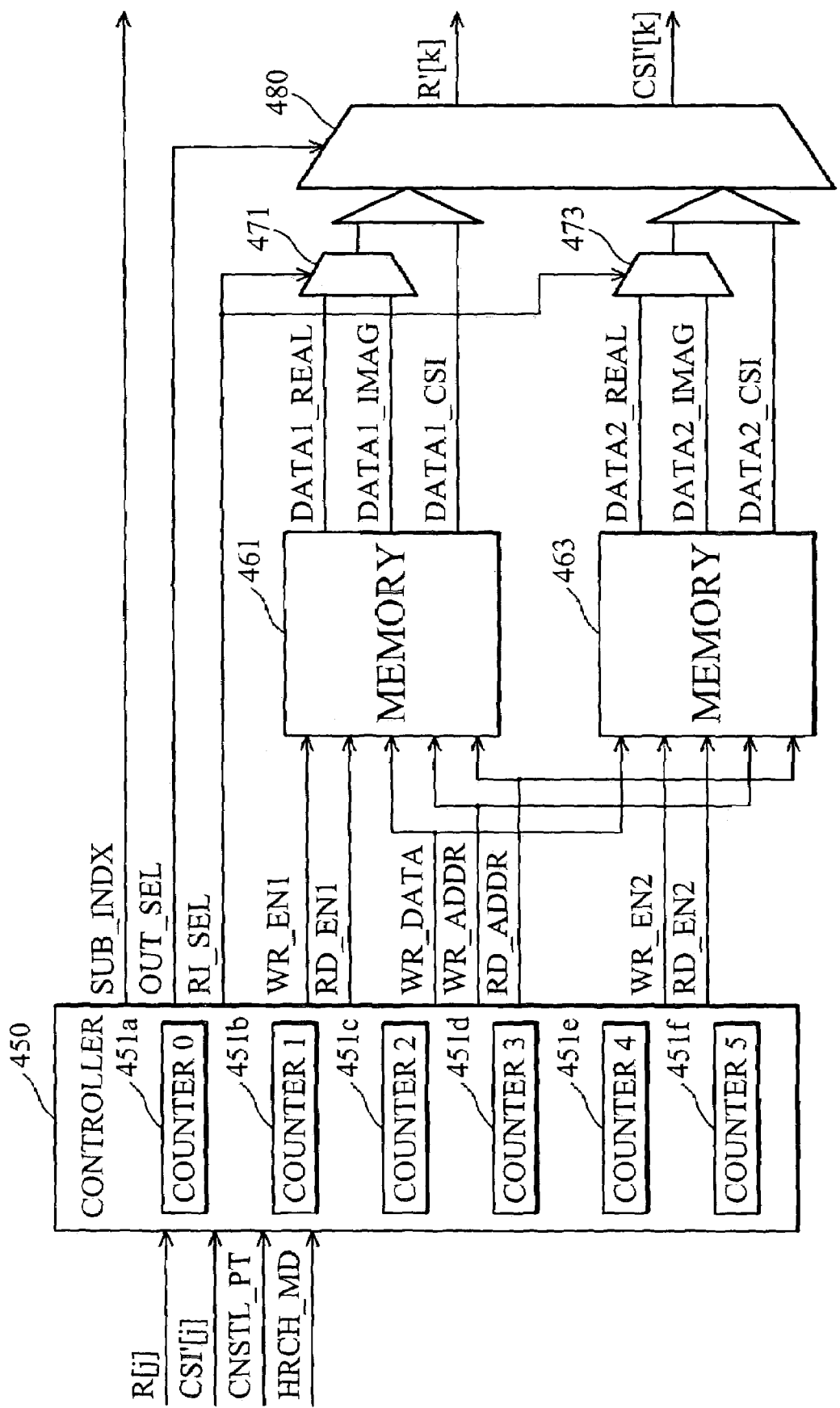
FIG. 4B is a block diagram illustrating an embodiment of the bit de-interleaver according to the invention.

The bit de-interleaver 230 is more clearly described herein by way of FIGS. 4A and 4B. In DVB-T, the bit interleaving block size is 126 bits. Therefore, the block interleaving process is repeated exactly twelve times per OFDM symbol of useful data in the 2K mode and forty-eight times per symbol in the 8K mode. Taking an OFDM symbol in the 2K mode as an example, a conceptual diagram of bit interleaving for a non-hierarchical 64-QAM constellation is illustrated in FIG. 4A. The OFDM symbol 401 is divided into 12 blocks of 126 data words. Each data word is a complex number containing real and imaginary parts, i.e., I component and Q component. As depicted, six sub-streams 410a-f are produced after bit de-interleaving. With a multiplexer 420, these sub-streams 410a-f are multiplexed into an output stream: $I_0, I_{105}, I_{21}, Q_{63}, Q_{42}, Q_{84}, \ldots, I_{1511}, I_{1490}, I_{1406}, Q_{1448}, Q_{1427}, Q_{1469}$. FIG. 4B illustrates an embodiment of the bit de-interleaver 230. In addition to R[j] and CSI'[j], a controller 450 accepts the modulation information including a constellation pattern and a hierarchy mode at its CNSTL_PT and HRCH_MD inputs. Six 7-bit counters 451a-f are incorporated in the controller 450. Depending on the constellation pattern and hierarchy mode, the controller 450 sets an initial offset value for each counter. In the case of the non-hierarchical 64-QAM constellation, the counters 451a-f are a modulo-N counter where N is the block size of 126 and the initial offset values thereof are set to be 0, 63, 105, 42, 21 and 84, respectively. Each counter is assigned to a corresponding sub-stream.

As show in FIG. 4B, the bit de-interleaver 230 is provided with two memories 461 and 463 to keep R[j] and CSI'[j]. The memory 461 and the memory 463 are designed in a ping-pong fashion to allow reading from the memory 461 while the memory 463 is being written, and vice versa. The controller 450 provides a write data bus WR_DATA, a write address bus $WR_{13}$ ADDR, a read address bus RD_ADDR, two read enable signals RD_EN1 and RD_EN2, as well as two write enable signals WR_EN1 and WR_EN2 to communicate with the memories 461 and 463. In operation, the controller 450 enables one of the counters 451a-f corresponding to the currently processed sub-stream for each read transaction, and assigns a count value from the enabled counter to RD_ADDR. As a result, the real and imaginary parts of the de-interleaved complex data are placed on memory output buses DATA1_REAL and DATA1_IMAG (or DATA2_REAL and DATAb2_IMAG). Also, the compressed CSI value associated with that de-interleaved complex data is placed on a memory output bus DATA1_CSI (or DATA2_CSI). For even-numbered sub-streams, the real part of the de-interleaved complex data is selected as output; for odd-numbered sub-streams, the imaginary part of the de-interleaved complex data is selected as output. To this end, the controller 450 provides control signals RI_SEL and OUT_SEL to multiplexers 471, 473 and 480. According to RI_SEL, the real or the imaginary part of the de-interleaved complex data is selectively output by way of the multiplexers 471 and 473. Furthermore, the multiplexer 480 selects the de-interleaving results from the memory 461 or 463 according to OUT_SEL.

Figure 5:
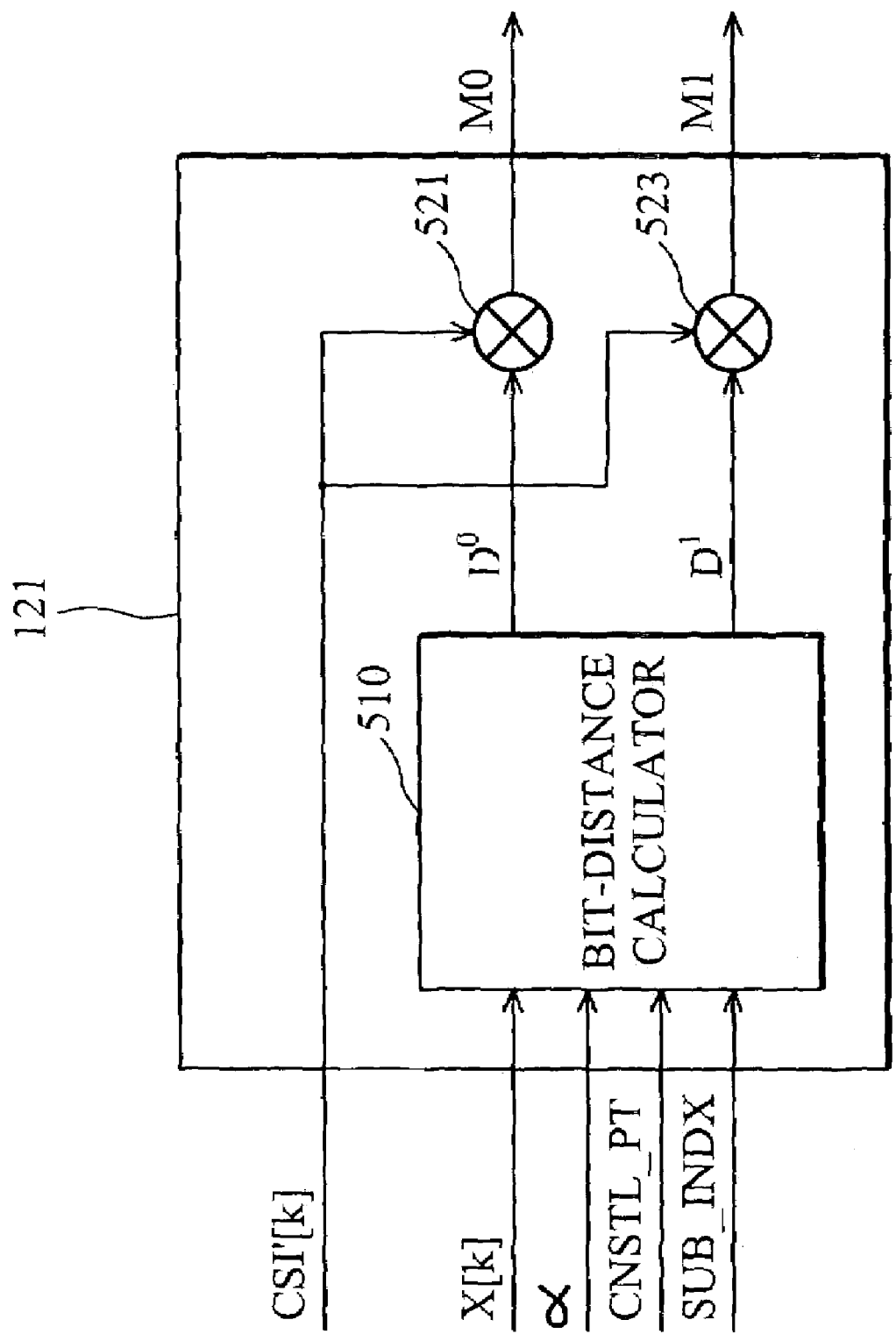
FIG. 5 is a block diagram illustrating an embodiment of the metric generator according to the invention.
Figure 6A:
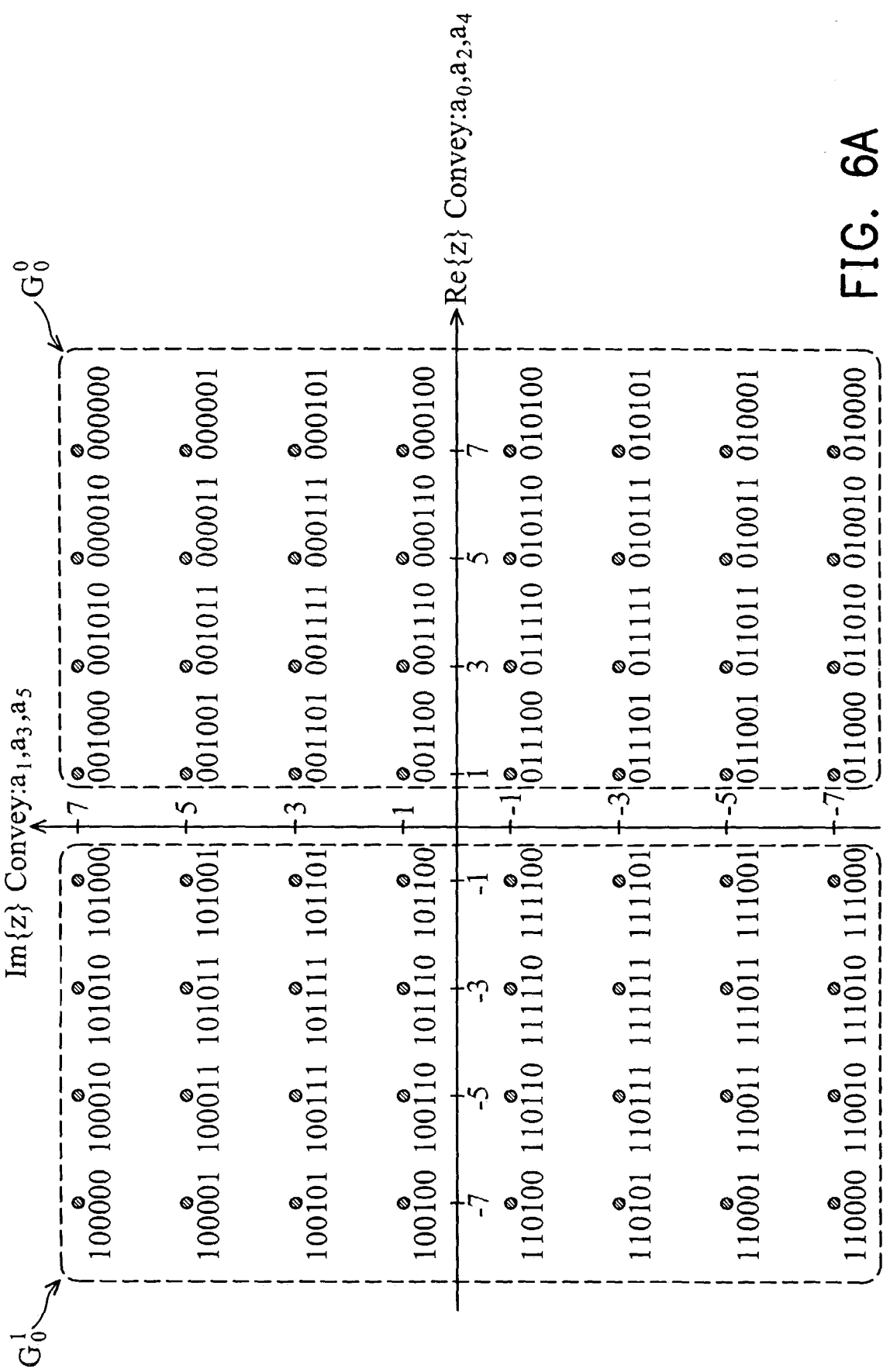
FIGS. 6A through 6F are graphs showing a 64-QAM constellation divided into a one group and a zero group for bits $a_0$, $a_1$, $a_2$, $a_3$, $a_4$ and $a_5$, respectively.
Figure 6B:
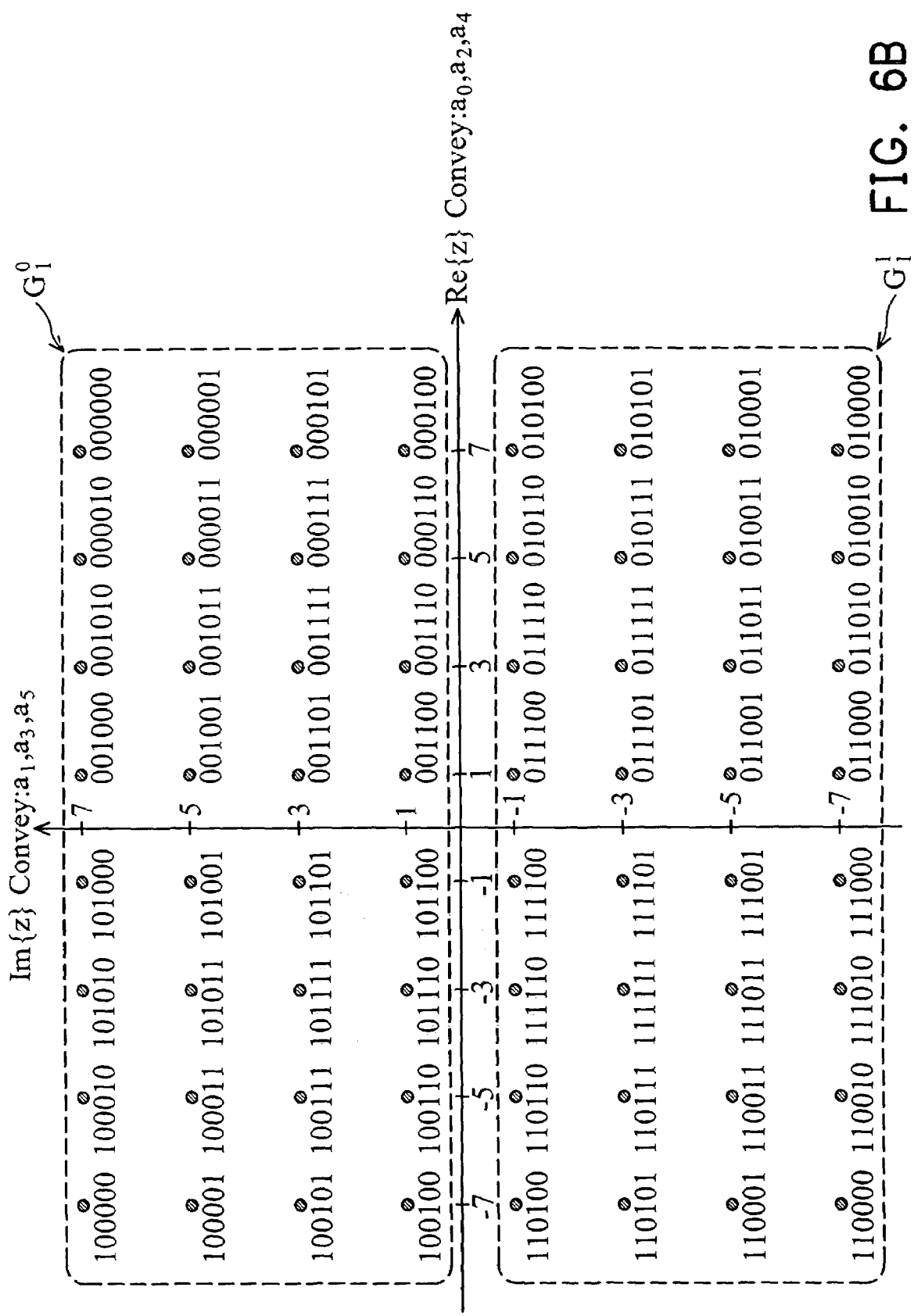
Figure 6C:
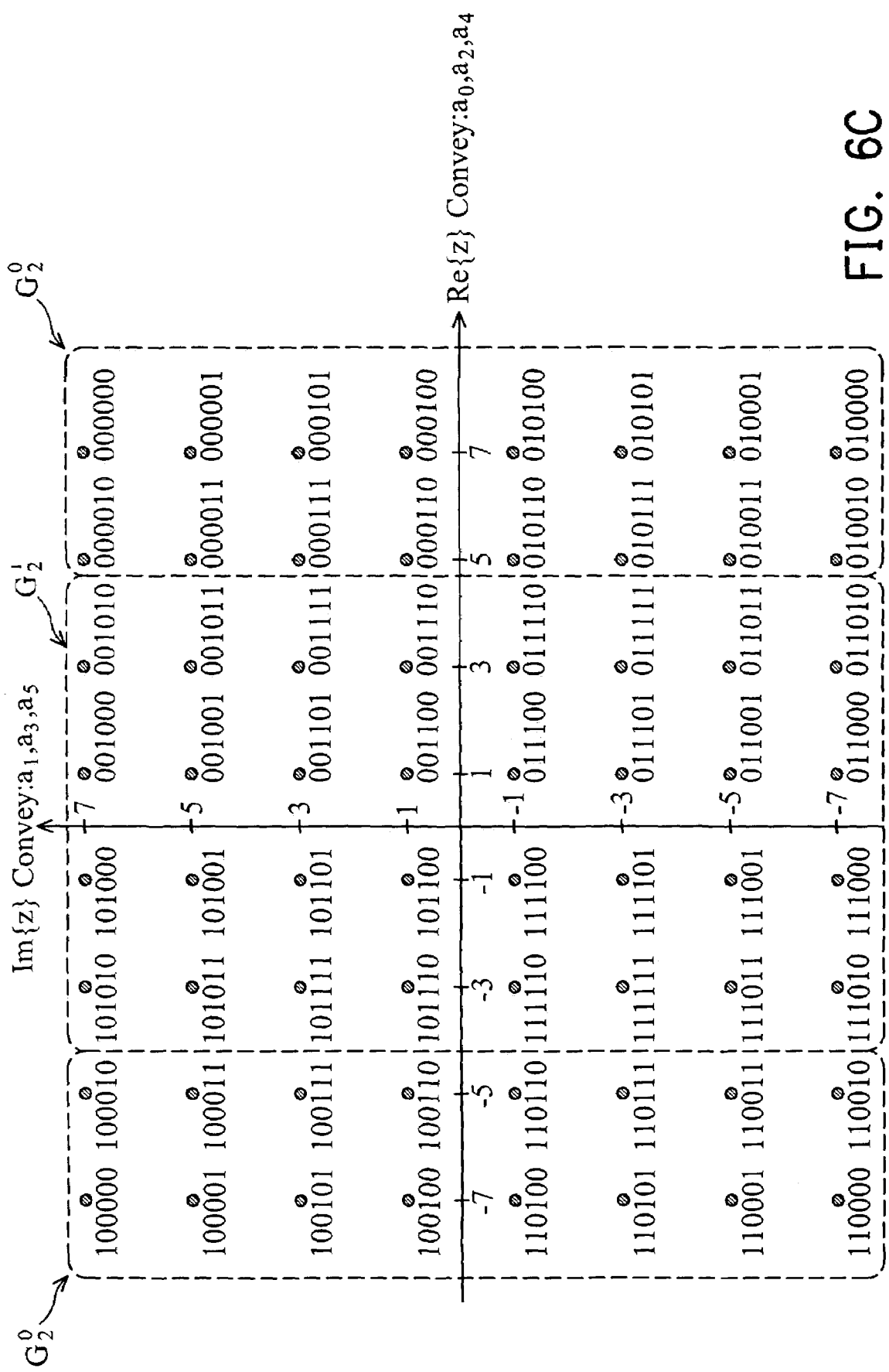
Figure 6D:
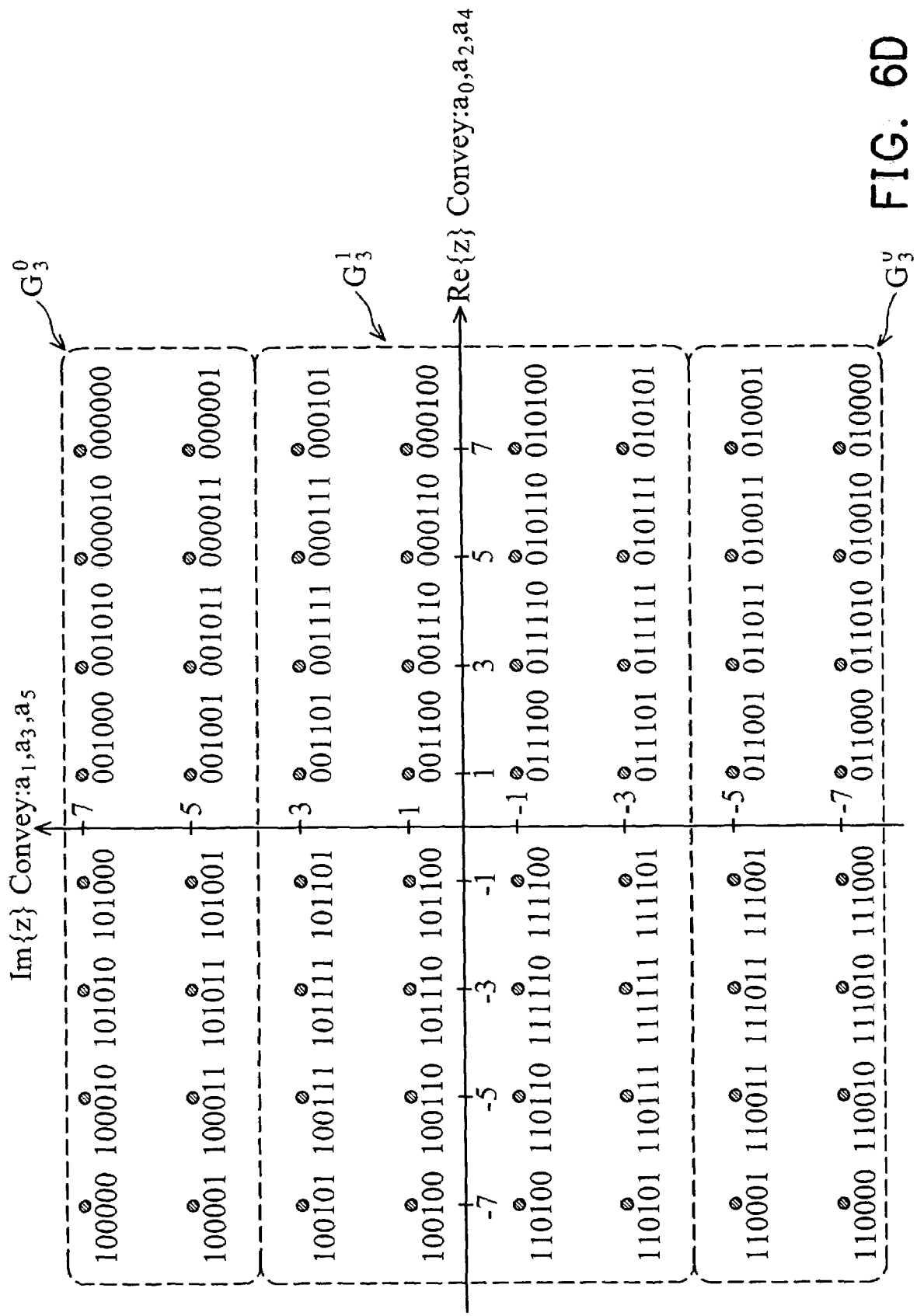
Figure 6E:
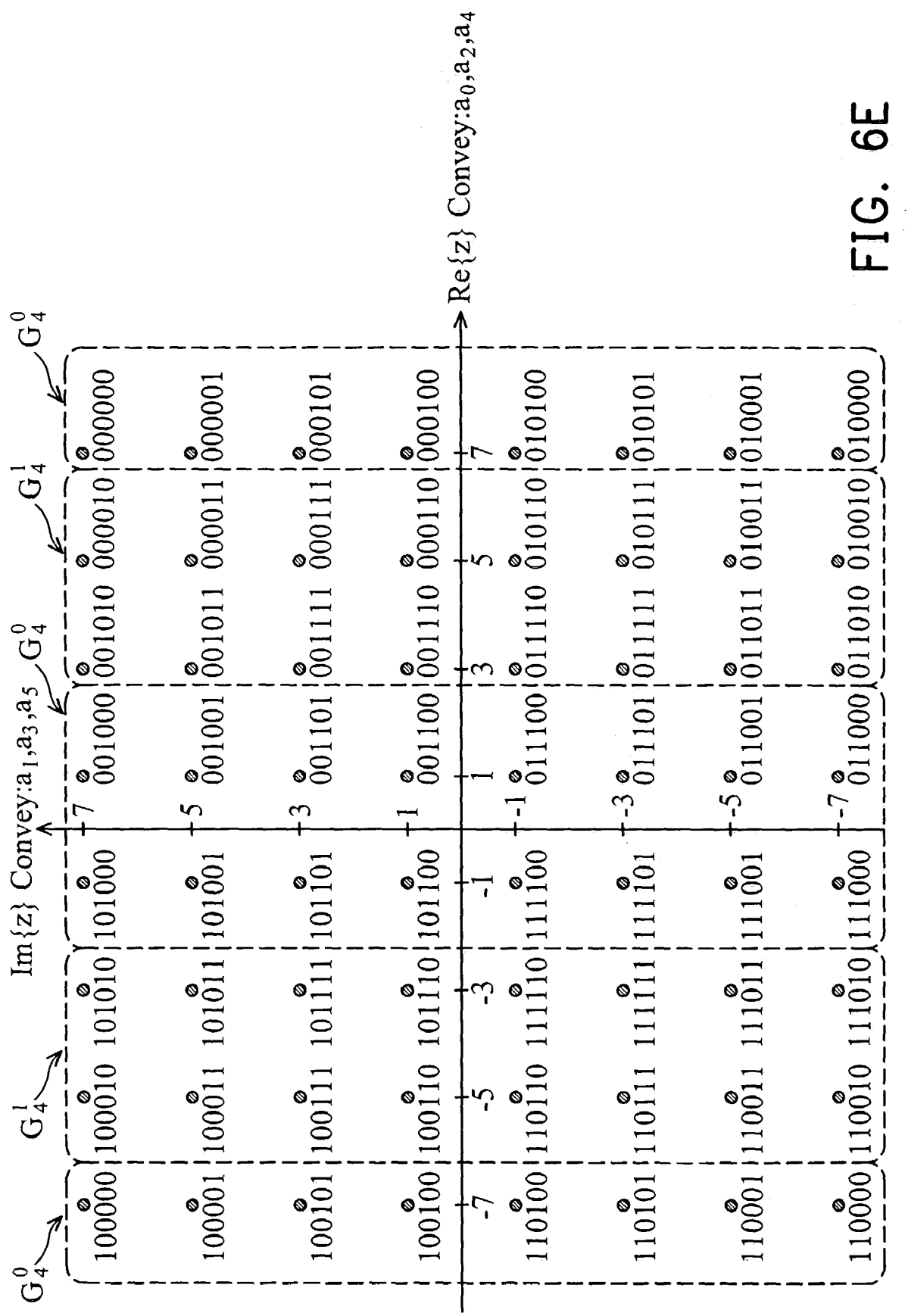
Figure 6F:
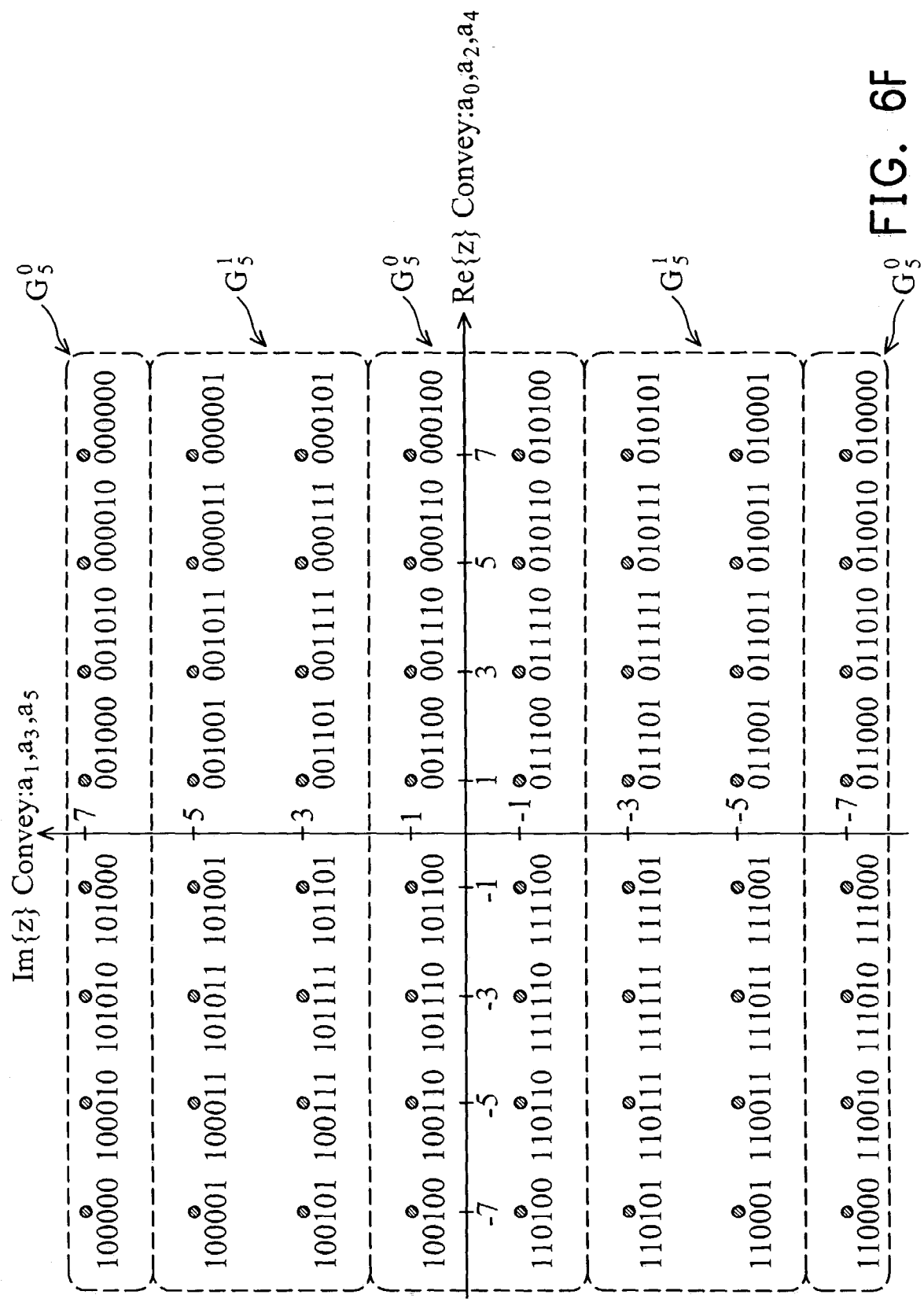

Referring now to FIG. 5, the metric generator 121 includes a bit-distance calculator 510 to receive the complex signal X[k] along with the constellation information (i.e., the constellation pattern herein). As mentioned above, the bit de-interleaver 230 provides the real part of the de-interleaved symbol-based data when an even-numbered sub-stream of a sub-carrier is to be processed, or the imaginary part of the de-interleaved symbol-based data when an odd-numbered sub-stream is to be processed. The metric generator 121 also accepts the constellation pattern at its input CNSTL_PT. The a value of the constellation pattern must be fed to the metric generator 121 as well. In addition, the metric generator 121 reads CSI'[k] and a sub-stream index, SUB_INDX, from the bit de-interleaver 230. The bit-distance calculator 510 is provided to calculate a first distance of the zero group and a second distance of the one group for each received sub-stream data. As described above, the constellation is classified into two groups according to the values at each bit, zero or one. For the purpose of illustration, FIGS. 6A through 6F show a 64-QAM constellation divided into a one group and a zero group for bits $a_0$, $a_1$, $a_2$, $a_3$, $a_4$ and $a_5$, respectively. Note that the real part of a sub-carrier symbol conveys the even-numbered bits $a_0$, $a_2$ and $a_4$, the imaginary part conveys the odd-numbered bits $a_1$, $a_3$ and $a_5$, and the bit ordering for the complex modulation symbol-based data is $a_0$, $a_1$, $a_2$, $a_3$, $a_4$, $a_5$. In FIGS. 6A through 6F, $G_n^0$ and $G_n^1$ respectively denote the zero and the one groups for the nth bit, n=0, 1, 2, 3, 4, 5.

Figure 7:
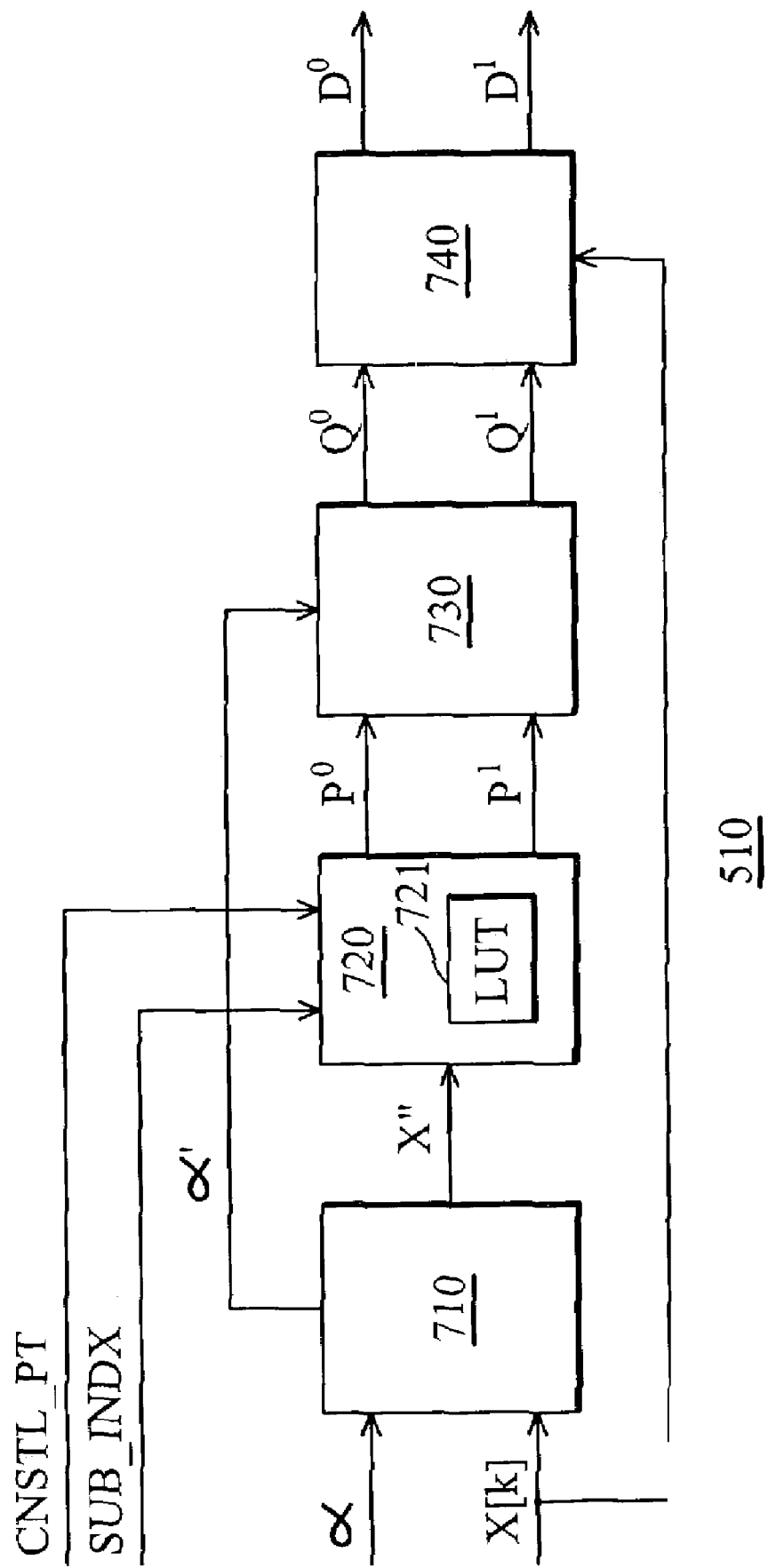
FIG. 7 is a block diagram illustrating a bit-distance calculator of the invention.

Turning to FIG. 7, a detailed block diagram of the bit-distance calculator 510 is illustrated. The bit-distance calculator 510 is made up of a first means 710, a second means 730, a detecting means 720 and a calculating means 740. With the first means 710, the complex signal X[k] is shifted by a predetermined value depending on the constellation and an integer part of the shifted complex signal is extracted, in which the predetermined value is the parameter α dictated by the DVB-T standard for the constellation. In this regard, the shifted complex signal X' is given by:

$$
\begin{aligned}
&\text{if } (X[k] > 0 \text{ and } X[k] \geq \alpha') \\
&\quad X' = X[k] - \alpha' \\
&\text{else if } (X[k] > 0 \text{ and } X[k] < \alpha') \\
&\quad X' = 1 \\
&\text{else if } (X[k] < 0 \text{ and } X[k] \leq -\alpha') \\
&\quad X' = X[k] + \alpha' \\
&\text{else if } (X[k] < 0 \text{ and } X[k] > -\alpha') \\
&\quad X' = -1
\end{aligned}
$$

where $\alpha' = \alpha - 1$. Then an integer part of the shifted complex signal, X'', is extracted, and fed to the detecting means 720. In addition to X'', the detecting means 720 is also fed with the constellation pattern CNSTL_PT and the sub-stream index SUB_INDX. Hence, the detecting means 720 can find a first position, $P^0$, and a second position, $P^1$, respectively located in the zero and the one groups for each bit from a lookup table 721 for the constellation. Note that $P^0$ is the nearest position to X'' within the zero group of the constellation while $P^1$ is the nearest position to X'' within the one group of the constellation. To speed up metric calculation, different lookup tables are implemented in the detecting means 720 for respective constellation. An exemplary lookup table for the 64-QAM constellation in DVB-T is listed here in TABLE 1.

TABLE 1

| SUB_INDX | X'' | $P^0$ | $P^1$ |
|---|---|---|---|
| 0, 1 | −7 | 1 | −7 |
|  | −6, −5 | 1 | −5 |
|  | −4, −3 | 1 | −3 |
|  | −2, −1, 0, 1 | 1 | −1 |
|  | 2, 3 | 3 | −1 |
|  | 4, 5 | 5 | −1 |
|  | 6, 7 | 7 | −1 |
| 2, 3 | −7 | −7 | −3 |
|  | −6, −5, −4, −3 | −5 | −3 |
|  | −2, −1 | −5 | −1 |
|  | 0, 1 | 5 | 1 |
|  | 2, 3, 4, 5 | 5 | 3 |
|  | 6, 7 | 7 | 3 |
| 4, 5 | −7, −6, −5 | −7 | −5 |

TABLE 1-continued

| SUB_INDX | X'' | $P^0$ | $P^1$ |
|---|---|---|---|
|  | −4, −3, −2, −1 | −1 | −3 |
|  | 0, 1, 2, 3 | 1 | 3 |
|  | 4, 5, 6, 7 | 7 | 5 |

Assuming that X'' is 3 for an even-numbered bit, $a_0$ (i.e., SUB_INDX=0), for example, $P^0$ is 3 and $P^1$ is −1 from TABLE 1. For an odd-numbered bit, $a_3$ (i.e., SUB_NDX=3), if X'' is −7 then $P^0 = -7$ and $P^1 = -3$ according to TABLE 1.

The first and the second positions $P^0$, $P^1$ are fed to the second means 730 where they are inversely shifted by the predetermined value, respectively. In this regard, the inversely shifted first and second positions, $Q^0$, $Q^1$, are given by:

$$
\begin{aligned}
&\text{if } (P^0 \geq 0) \\
&\quad Q^0 = P^0 + \alpha' \\
&\text{else} \\
&\quad Q^0 = P^0 - \alpha'
\end{aligned}
$$

and $$
\begin{aligned}
&\text{if } (P^1 \geq 0) \\
&\quad Q^1 = P^1 + \alpha' \\
&\text{else} \\
&\quad Q^1 = P^1 - \alpha'
\end{aligned}
$$

where $\alpha' = \alpha - 1$. After that, the calculating means 740 calculates the first distance of the zero group between X[k] and $Q^0$ as well as the second distance of the one group between X[k] and $Q^1$, respectively. In one embodiment, the first distance of the zero group, $D^0$, and the second distance of the one group, $D^1$, are calculated from:

$$D^0 = (X[k] - Q^0)^2$$

and $$D^1 = (X[k] - Q^1)^2$$

It should be noted that X[k] only contains one-dimensional information—to wit, the real or imaginary part. Referring again to FIG. 5, the metric generator 121 further includes a multiplier 521 where $D^0$ is multiplied by CSI'[k] to yield the bit metric of zero, M0. In other words, CSI'[k] is a weighting factor associated with X[k]. The metric generator 121 also has another multiplier 523 where $D^1$ is multiplied by the same CSI'[k] to yield the bit metric of one, M1. Accordingly, bit metrics of M0 and M1 can be made for each received bit to offer the soft-decision information to the Viterbi decoder.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A metric generator comprising:
a bit-distance calculator receiving a complex signal along with a constellation that is divided into a one group and a zero group for each bit location, in which the complex signal is modulated using the constellation, for calculating a first distance of the zero group and a second distance of the one group for each received bit, comprising:
means for shifting the complex signal by a predetermined value depending on the constellation and extracting an integer part of the shifted complex signal;
means for finding a first position and a second position respectively located in the zero and the one groups for each bit from a lookup table for the constellation, wherein the first position is nearest to the integer part of the shifted complex signal within the zero group of the constellation and the second position is nearest to the integer part of the shifted complex signal within the one group of the constellation;
means for inversely shifting the first and the second positions by the predetermined value respectively; and
means for respectively calculating the first distance of the zero group between the complex signal and the inversely shifted first position as well as the second distance of the one group between the complex signal and the inversely shifted second position;
means for multiplying the first distance of the zero group by a weighting factor associated with the complex signal to yield a bit metric of zero for each received bit; and
means for multiplying the second distance of the one group by the weighting factor associated with the complex signal to yield a bit metric of one for each received bit.

2. The metric generator of claim 1 wherein the bit-distance calculator is fed with a real part of the complex signal when an even-numbered bit is to be processed.

3. The metric generator of claim 1 wherein the bit-distance calculator is fed with an imaginary part of the complex signal when an odd-numbered bit is to be processed.

4. The metric generator of claim 1 wherein the complex signal is compliant with a standard of Digital Video Broadcasting-Terrestrial (DVB-T).

5. The metric generator of claim 4 wherein the constellation is representative of QPSK, 16-QAM, 64-QAM, non-uniform 16-QAM or non-uniform 64-QAM mapping.

6. The metric generator of claim 5 wherein the predetermined value is a parameter a dictated by the DVB-T standard for the constellation.

7. The metric generator of claim 5 wherein the constellation is divided into the one and the zero groups depending on a bit value of 1 or 0 at each bit location.

8. The metric generator of claim 1 wherein the weighting factor is a channel-state information value.

9. An orthogonal frequency division multiplexing (OFDM) receiver comprising:
a de-interleaver for de-interleaving a series of symbol-based data inverse to interleaving operations at a transmitter end, in which the symbol-based data is modulated with a constellation;
a dynamic quantizer coupled to the de-interleaver, for compressing the de-interleaved symbol-based data to yield a complex signal in accordance with a scheme of the constellation; and
a metric generator coupled to the dynamic quantizer to receive the complex signal, for partitioning the constellation into a one group and a zero group based upon the location of each bit, generating a bit metric of zero with respect to the zero group of the constellation for each received bit, and generating a bit metric of one with respect to the one group of the constellation for each received bit by using the received complex signal and a channel-state information value associated with the received complex signal; and
wherein the de-interleaver provides a real part of the de-interleaved symbol-based data when an even-numbered bit is to be processed; and
the metric generator computes the bit metric of zero and the bit metric of one for the even-numbered bit from a real part of the complex signal and a channel-state information value associated with the complex signal.

10. The OFDM receiver of claim 9 wherein the series of symbol-based data is compliant with a standard of Digital Video Broadcasting-Terrestrial (DVB-T) and the de-interleaver is an inner de-interleaver comprising symbol and bit de-interleavers compliant with the DVB-T standard.

11. The OFDM receiver of claim 9 wherein the constellation is divided into the one and the zero groups depending on a bit value of 1 or 0 at each bit location.

12. An orthogonal frequency division multiplexing (OFDM) receiver comprising:
a first dynamic quantizer for compressing a series of channel-state information values;
a bit de-interleaver for de-interleaving a series of symbol-based data inverse to interleaving operations at a transmitter end and providing the compressed channel-state information value associated with the de-interleaved symbol-based data, in which the symbol-based data is modulated with a constellation;
a second dynamic quantizer coupled to the bit de-interleaver, for compressing the de-interleaved symbol-based data to yield a complex signal in accordance with a scheme of the constellation; and
a metric generator respectively coupled to the second dynamic quantizer and the bit de-interleaver to receive the complex signal and the compressed channel-state information value associated with the complex signal, for partitioning the constellation into a one group and a zero group for each bit location, and generating bit metrics of zero and one with respect to the zero and the one groups of the constellation for each received bit, separately;
wherein the bit metric of zero and the bit metric of one for an even-numbered bit are computed from a real part of the complex signal and the compressed channel-state information value associated with the complex signal;
wherein the bit metric of zero and the bit metric of one for an odd-numbered bit are computed from an imaginary part of the complex signal and the compressed channel-state information value associated with the complex signal.

13. The OFDM receiver of claim 12 wherein the bit de-interleaver provides a real part of the de-interleaved symbol-based data when the even-numbered bit is to be processed.

14. The OFDM receiver of claim 12 wherein the bit de-interleaver provides an imaginary part of the de-interleaved symbol-based data when the odd-numbered bit is to be processed.

15. The OFDM receiver of claim 12 wherein the series of symbol-based data is compliant with a standard of Digital Video Broadcasting-Terrestrial (DVB-T) and the de-interleaver is an inner de-interleaver comprising symbol and bit de-interleavers compliant with the DVB-T standard.

16. The OFDM receiver of claim 12 wherein the constellation is divided into the one and the zero groups depending on a bit value of 1 or 0 at each bit location.

17. An orthogonal frequency division multiplexing (OFDM) receiver comprising:
- a de-interleaver for de-interleaving a series of symbol-based data inverse to interleaving operations at a transmitter end, in which the symbol-based data is modulated with a constellation;
- a dynamic quantizer coupled to the de-interleaver, for compressing the de-interleaved symbol-based data to yield a complex signal in accordance with a scheme of the constellation; and
- a metric generator coupled to the dynamic quantizer to receive the complex signal, for partitioning the constellation into a one group and a zero group based upon the location of each bit, generating a bit metric of zero with respect to the zero group of the constellation for each received bit, and generating a bit metric of one with respect to the one group of the constellation for each received bit by using the received complex signal and a channel-state information value associated with the received complex signal; and
- wherein the de-interleaver provides an imaginary part of the de-interleaved symbol-based data when an odd-numbered bit is to be processed; and
- the metric generator computes the bit metric of zero and the bit metric of one for the odd-numbered bit from an imaginary part of the complex signal and a channel-state information value associated with the complex signal.

* * * * *